(12) United States Patent
Freydina et al.

(10) Patent No.: US 7,083,733 B2
(45) Date of Patent: Aug. 1, 2006

(54) WATER TREATMENT SYSTEM AND METHOD

(75) Inventors: Evgeniya Freydina, Acton, MA (US); Anil D. Jha, Lincoln, MA (US); Frederick Wilkins, Pepperell, MA (US); Aytac Sezgi, Bedford, NH (US); Reshma Madhusudan, Arlington Heights, IL (US)

(73) Assignee: USFilter Corporation, Warrendale, PA (US)

( * ) Notice: Subject to any disclaimer, the term of this patent is extended or adjusted under 35 U.S.C. 154(b) by 235 days.

(21) Appl. No.: 10/712,248

(22) Filed: Nov. 13, 2003

(65) Prior Publication Data

US 2005/0103722 A1    May 19, 2005

(51) Int. Cl.
  *C02F 1/46*  (2006.01)
(52) U.S. Cl. .................................. 210/739; 210/748
(58) Field of Classification Search .............. 210/739, 210/748
  See application file for complete search history.

(56) References Cited

U.S. PATENT DOCUMENTS

| | | |
|---|---|---|
| 2,514,415 A | 7/1950 | Rasch |
| 2,681,319 A | 6/1954 | Bodamer |
| 2,681,320 A | 6/1954 | Bodamer |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,923,674 A | 2/1960 | Kressman |
| 2,943,989 A | 7/1960 | Kollsman |
| 3,014,855 A | 12/1961 | Kressman |
| 3,074,864 A | 1/1963 | Gaysowski |
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal et al. |
| 3,165,460 A | 1/1965 | Zang et al. |
| 3,291,713 A | 12/1966 | Parsi |
| 3,330,750 A | 7/1967 | McRae et al. |

(Continued)

FOREIGN PATENT DOCUMENTS

AU    B-18629/92    10/1992

(Continued)

OTHER PUBLICATIONS

ASTM, "Standard Practice for Calculation and Adjustment of the Langelier Saturation Index for Reverse Osmosis," Designation: D3739-94 (Reapproved 1998), pp. 1-4.

(Continued)

*Primary Examiner*—Betsey Morrison Hoey

(57) ABSTRACT

A water treatment system provides treated or softened water to a point of use by removing a portion of any hardness-causing species contained in water from a point of entry coming from a water source, such as municipal water, well water, brackish water and water containing foulants. The water treatment system typically treats the water containing at least some undesirable species before delivering the treated water to a point of use. The water treatment system has a reservoir system in line with an electrochemical device such as an electrodeionization device. The water treatment system has a sensor or a set of sensors for measuring at least one property of the water or an operating condition of the treatment system. The water treatment system also has a controller for adjusting or regulating at least one operating parameter of the treatment system or a component of the water treatment system to optimize the operation and performance of the system or components of the system to supply water tailored to quality requirements.

30 Claims, 3 Drawing Sheets

U.S. PATENT DOCUMENTS

| | | |
|---|---|---|
| 3,341,441 A | 9/1967 | Giuffrida et al. |
| 3,375,208 A | 3/1968 | Duddy |
| 3,627,703 A | 12/1971 | Kojima et al. |
| 3,630,378 A * | 12/1971 | Bauman .................... 210/157 |
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno et al. |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeax et al. |
| 5,240,579 A | 8/1993 | Kedem |
| 5,254,227 A | 10/1993 | Cawlfield et al. |
| 5,259,936 A | 11/1993 | Ganzi |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,376,253 A | 12/1994 | Rychen et al. |
| 5,411,641 A | 5/1995 | Trainham, III et al. |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Batchelder et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |
| 5,925,240 A | 7/1999 | Wilkins et al. |
| 5,928,807 A | 7/1999 | Elias |
| 5,954,935 A | 9/1999 | Neumeister et al. |
| 5,961,805 A | 10/1999 | Terada et al. |
| 5,980,716 A | 11/1999 | Horinouchi et al. |
| 6,056,878 A | 5/2000 | Tessier et al. |
| 6,099,716 A | 8/2000 | Molter et al. |
| 6,103,125 A * | 8/2000 | Kuepper .................... 210/637 |
| RE36,972 E * | 11/2000 | Baker et al. ............ 422/186.07 |
| 6,146,524 A * | 11/2000 | Story ........................ 210/199 |

| | | | | | |
|---|---|---|---|---|---|
| 6,149,788 A | 11/2000 | Tessier et al. | GB | 942762 | 11/1963 |
| 6,171,374 B1 | 1/2001 | Barton et al. | GB | 104026 | 11/1966 |
| 6,187,154 B1* | 2/2001 | Yamaguchi et al. ..... 204/228.6 | GB | 1137679 | 12/1968 |
| 6,187,162 B1 | 2/2001 | Mir | GB | 1 381 681 A | 1/1975 |
| 6,190,528 B1 | 2/2001 | Li et al. | GB | 1448533 | 9/1976 |
| 6,190,553 B1* | 2/2001 | Lee ........................... 210/602 | JP | 54-5888 | 1/1979 |
| 6,190,558 B1 | 2/2001 | Robbins | JP | 07-4155750 | 6/1995 |
| 6,193,869 B1 | 2/2001 | Towe et al. | JP | 07-265865 | 10/1995 |
| 6,197,174 B1 | 3/2001 | Barber et al. | JP | 09-253643 | 9/1997 |
| 6,197,189 B1* | 3/2001 | Schwartz et al. ........... 210/192 | JP | 2001-79358 | 3/2001 |
| 6,214,204 B1 | 4/2001 | Gadkaree et al. | JP | 2001-79553 | 3/2001 |
| 6,228,240 B1 | 5/2001 | Terada et al. | JP | 2001-104960 | 4/2001 |
| 6,235,166 B1 | 5/2001 | Towe et al. | JP | 2001-113137 | 4/2001 |
| 6,248,226 B1 | 6/2001 | Shinmei et al. | JP | 2001-113279 | 4/2001 |
| 6,254,741 B1 | 7/2001 | Stuart et al. | JP | 2001-113280 | 4/2001 |
| 6,258,278 B1 | 7/2001 | Tonelli et al. | JP | 2001-121152 | 5/2001 |
| 6,267,891 B1 | 7/2001 | Tonelli et al. | JP | 2005007347 | 1/2005 |
| 6,274,019 B1* | 8/2001 | Kuwata ...................... 204/632 | JP | 2005007348 | 1/2005 |
| 6,284,124 B1 | 9/2001 | DiMascio et al. | RO | 114 874 B | 8/1999 |
| 6,284,399 B1 | 9/2001 | Oko et al. | SU | 216622 | 11/1972 |
| 6,296,751 B1 | 10/2001 | Mir | SU | 990256 | 1/1983 |
| 6,303,037 B1 | 10/2001 | Tamura et al. | SU | 1118389 | 10/1984 |
| 6,375,812 B1* | 4/2002 | Leonida ...................... 204/269 | WO | WO 92/11089 | 7/1992 |
| 6,402,916 B1 | 6/2002 | Sampson et al. | WO | WO 95/32052 | 11/1995 |
| 6,402,917 B1 | 6/2002 | Emery et al. | WO | WO 95/32791 | 12/1995 |
| 6,482,304 B1 | 11/2002 | Emery et al. | WO | WO 96/22162 | 7/1996 |
| 6,607,647 B1 | 8/2003 | Wilkins et al. | WO | WO 97/25147 | 7/1997 |
| 6,607,668 B1 | 8/2003 | Rela | WO | WO 97/46491 | 12/1997 |
| 6,627,073 B1* | 9/2003 | Hirota et al. ................ 210/169 | WO | WO 97/46492 | 12/1997 |
| 6,648,307 B1* | 11/2003 | Nelson et al. ........... 261/121.1 | WO | WO 98/11987 | 3/1998 |
| 6,649,037 B1 | 11/2003 | Liang et al. | WO | WO 98/17590 | 4/1998 |
| 6,766,812 B1 | 7/2004 | Gadini | WO | WO 98/20972 | 5/1998 |
| 6,783,666 B1* | 8/2004 | Takeda et al. .............. 210/96.1 | WO | WO 98/58727 A1 | 12/1998 |
| 6,808,608 B1* | 10/2004 | Srinivasan et al. ......... 204/533 | WO | WO 99/39810 | 8/1999 |
| 6,824,662 B1 | 11/2004 | Liang et al. | WO | WO 00/30749 | 6/2000 |
| 2001/0003329 A1 | 6/2001 | Sugaya et al. | WO | WO 00/64325 A2 | 11/2000 |
| 2002/0092769 A1 | 7/2002 | Garcia Benny et al. | WO | WO 00/75082 A1 | 12/2000 |
| 2003/0080467 A1 | 5/2003 | Andrews et al. | WO | WO 01/49397 A1 | 7/2001 |
| 2003/0089609 A1 | 5/2003 | Liang Li-Shiang et al. | WO | WO 02/04357 A1 | 1/2002 |
| 2003/0098266 A1 | 5/2003 | Shiue Lih-Ren et al. | WO | WO 02/14224 A1 | 2/2002 |
| 2003/0155243 A1 | 8/2003 | Sferrazza Alois | WO | WO 03/086590 A1 | 10/2003 |
| 2003/0201235 A1 | 10/2003 | Chidambaran et al. | | | |
| 2004/0079700 A1 | 4/2004 | Liang et al. | | | |
| 2005/0109703 A1 | 5/2005 | Newenzhizen | | | |

FOREIGN PATENT DOCUMENTS

| | | |
|---|---|---|
| CA | 2316012 A1 | 11/2001 |
| CN | 1044411 A | 8/1990 |
| DE | 1 201 055 | 9/1965 |
| DE | 3238280 A1 | 4/1984 |
| DE | 4016000 A1 | 11/1991 |
| DE | 44 18 812 A1 | 12/1995 |
| DE | 199 42 347 A1 | 3/2001 |
| EP | 0170895 A2 | 2/1986 |
| EP | 0 503 589 A1 | 9/1992 |
| EP | 0 621 072 A2 | 10/1994 |
| EP | 0 621 072 B1 | 10/1994 |
| EP | 0 680 932 A2 | 11/1995 |
| EP | 0803474 A2 | 10/1997 |
| EP | 0 870 533 A1 | 10/1998 |
| EP | 1 068 901 A2 | 1/2001 |
| EP | 1068901 A2 | 1/2001 |
| EP | 1075 868 A2 | 2/2001 |
| EP | 1 101 790 A1 | 5/2001 |
| EP | 1 106 241 A1 | 6/2001 |
| EP | 1172145 A2 | 1/2002 |
| EP | 1222954 A1 | 7/2002 |
| EP | 1506941 A1 | 2/2005 |
| GB | 776469 | 6/1957 |
| GB | 877239 | 9/1961 |
| GB | 880344 | 10/1961 |
| GB | 893051 | 4/1962 |

OTHER PUBLICATIONS

Calay, J.-C. et al., "The Use of EDI to Reduce the Ammonia Concentration in Steam Generators Blowdown of PWR Nuclear Power Plants," *PowerPlant Chemistry*, vol. 2, No. 8, 2000, pp. 467-470.

Dimascio et al., "Continuous Electrodeionization: Production of High-Purity Water without Regeneration Chemicals," The Electrochemical Society *Interface*, Fall 1998, pp. 26-29.

Dimascio et al., "Electrodiaresis Polishing (An Electrochemical Deionization Process)," date unknown, pp. 164-172.

Dow Chemical, "Dowex Marathon A Ion Exchange Resin," published Dec. 1999, Product Literature reprinted from www.dow.com.

Dow Chemical, "Dowex Marathon A2 Ion Exchange Resin," published Nov. 1998, Product Literature reprinted from www.dow.com.

Dupont Nafion PFSA Products, Technical Information, "Safe Handling and Use of Perfluorosulfonic Acid Products," Feb. 2004. 4 pages.

Farmer et al., Capacitive Deionization of $NH_4ClO_4$ Solutions with Carbon Aerogel Electrodes, *J. Appl. Electrochemistry*, vol. 26, (1996), pp. 1007-1018.

FDA, "Guide to Inspections of High Purity Water Systems," printed from www.fda.gov. on Mar. 30, 2004, date unknown.

Ganzi, G.C. et al., "Electrodeionization: Theory and Practice of Continuous Electrodeionization," *Ultrapure Water*, Jul./Aug. 1997, pp. 64-69.

G.J. Gittens et al., "The Application of Electrodialysis to Demineralisation," A.I.Ch.E.-I.Chem.E. Symposium Series No. 9, 1965 (London: Instn chem. Engrs), pp. 79-83.

Glueckauf, "Electro-Deionisation Through a Packed Bed," *British Chemical Engineering*, Dec. 1959, pp. 646-651.

Hobro et al., "Recycling of Chromium from Metal Finishing Waste Waters Using Electrochemical Ion Exchange (EIX)," 1994, pp. 173-183, publication and date unknown.

Jha, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510-517.

Kedem et al., "EDS—Sealed Cell Electrodialysis," *Desalination*, vol. 46, 1983, pp. 291-299.

Kedem et al., "Reduction of Polarization by Ion-Conduction Spacers: Theoretical Evaluation of a Model System," *Desalination*, vol. 27, 1978, pp. 143-156.

Korngold, "Electrodialysis Process Using Ion Exchange Resins Between Membranes," *Desalination*, vol. 16, 1975, pp. 225-233.

Laktionov, Evgueni Viktorovitch, "Déminéralisation De Solutions Électrolytiques Diluées. Analyse Comparative Des Performances De Differents Procédés D'Électrodialyse", Directeur de these, Université Montpellier II, Science Et Technique Du Languedoc, 17 Juillet 1998.

Matejka, "Continuous Production of High-Purity Water by Electro-Deionisation," *J. Appl. Chem., Biotechnol.*, vol. 21, Apr. 1971, pp. 117-120.

Pourcelly, Gerald, Conductivity and selectivity of ion exchange membranes: structure-correlations, *Desalination*, vol. 147 (2002) pp. 359-361.

Purolite Technical Bulletiin, Hypersol-Macronet™ Sorbent Resins, 1995.

V. Shaposhnik et al., "Demineralization of water by electrodialysis with ion-exchange membranes, grains and nets," *Desalination*, vol. 133, (2001), pp. 211-214.

R. Simons, "Strong Electric Field Effects on Proton Transfer Between Membrane-Bound Amines and Water," *Nature*, vol. 280, Aug. 30, 1979, pp. 824-826.

R. Simons, "Electric Field Effects on Proton Transfer Between Ionizable Groups and Water in Ion Exchange Membranes," *Electrochimica Acta*, vol. 29, No. 2, 1984, pp. 151-158.

R. Simons, "Water Splitting In Ion Exchange Membranes," Pergamon Press Ltd., 1985, pp. 275-282.

R. Simons, "The Origin and Elimination of Water Splitting in Ion Exchange Membranes During Water Demineralisation By Electrodialysis," *Desalination*, vol. 28, Jan. 29, 1979, pp. 41-42.

USFilter, "H-Series Industrial CDI® Systems," product information, 1998, 4 pgs.

Walters et al., "Concentration of Radioactive Aqueous Wastes," *Industrial and Engineering Chemistry*, Jan. 1955, pp. 61-67.

Warshawsky et al., "Thermally Regenerable Polymerable Polymeric Crown Ethers, II Synthesis and Application in Electrodialysis," pp. 579-584, publication and date unknown.

Yoran Oren et al., "Studies on Polarity Reversal with Continuous Deionization," *Desalination*, Elsevier Scientific Publishing Co., Amsterdam, NL, vol. 86, No. 2, Jun. 1, 1992, pp. 155-171.

Wood, J.H. et al., "Continuous Electrodeionisation: Module Design Considerations for the Production of High Purity Water," *Proc. Of IEX at the Millenium*, Jul. 16, 2000, pp. 44-51.

* cited by examiner

WATER TREATMENT SYSTEM AND METHOD

BACKGROUND OF THE INVENTION

1. Field of the Invention

The present invention relates generally to a system and method for treating a fluid and, more particularly, to a water treatment system incorporating an electrochemical device and a reservoir system with sensors and baffle plates for tailoring delivery of treated water to a point of use.

2. Description of Related Art

Water that contains hardness species such as calcium and magnesium may be undesirable for some uses in industrial, commercial and household applications. The typical guidelines for a classification of water hardness are: zero to 60 milligrams per liter (mg/l) as calcium carbonate is classified as soft; 61 to 120 mg/l as moderately hard; 121 to 180 mg/l as hard; and more than 180 mg/l as very hard.

Hard water can be softened or treated by removing the hardness ion species. Examples of systems that remove such species include those that use ion exchange beds. In such systems, the hardness ions become ionically bound to oppositely charged ionic species that are mixed on the surface of the ion exchange resin. The ion exchange resin eventually becomes saturated with ionically bound hardness ion species and must be regenerated. Regeneration typically involves replacing the bound hardness species with more soluble ionic species, such as sodium chloride. The hardness species bound on the ion exchange resin are replaced by the sodium ions and the ion exchange resins are ready again for a subsequent water softening step.

Other systems have been disclosed. For example, Dosch, in U.S. Pat. No. 3,148,687 teaches a washing machine including a water softening arrangement using ion exchange resins. Similarly, Gadini et al., in International Application Publication No. WO00/64325, disclose a household appliance using water with an improved device for reducing the water hardness. Gadini et al. teach of a household appliance having a control system, a water supply system from an external source and a softening system with an electrochemical cell. Electrodeionization (EDI) is one process that may be used to soften water. EDI is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices can include media having permanent or temporary charge and can be operated to cause electrochemical reactions designed to achieve or enhance performance. These devices also include electrically active membranes such as semi-permeable ion exchange or bipolar membranes.

Continuous electrodeionization (CEDI) is a process wherein the primary sizing parameter is the transport through the media, not the ionic capacity of the media. A typical CEDI device includes alternating electroactive semi-permeable anion and cation exchange membranes. The spaces between the membranes are configured to create liquid flow compartments with inlets and outlets. A transverse DC electrical field is imposed by an external power source using electrodes at the bounds of the membranes and compartments. Often, electrode compartments are provided so that reaction product from the electrodes can be separated from the other flow compartments. Upon imposition of the electric field, ions in the liquid are attracted to their respective counter-electrodes. The adjoining compartments, bounded by the electroactive anion permeable membrane facing the anode and the electroactive cation membrane facing the cathode, typically become ionically depleted and the compartments, bounded by the electroactive cation permeable membrane facing the anode and the electroactive anion membrane facing the cathode, typically become ionically concentrated. The volume within the ion-depleting compartments and, in some embodiments, within the ion-concentrating compartments, also includes electrically active media. In CEDI devices, the media may include intimately mixed anion and cation exchange resins. The ion-exchange media typically enhances the transport of ions within the compartments and may participate as substrates for controlled electrochemical reactions. Electrodeionization devices have been described by, for example, Giuffrida et al. in U.S. Pat. Nos. 4,632,745, 4,925,541 and 5,211,823, by Ganzi in U.S. Pat. Nos. 5,259,936 and 5,316,637, by Oren et al. in U.S. Pat. No. 5,154,809 and by Kedem in U.S. Pat. No. 5,240,579.

SUMMARY OF THE INVENTION

In one aspect, the present invention provides a storage system comprising a pressurized reservoir system having a first inlet fluidly connected to a point of entry and a second inlet fluidly connected to an electrochemical device, at least one conductivity sensor in the pressurized reservoir system and a distribution system fluidly connected to the pressurized reservoir system and to a point of use.

In another embodiment, the present invention provides a water treatment system comprising a reservoir system fluidly connected to a point of entry and having a first baffle plate, a water treatment device fluidly connected to the reservoir system and a water distribution system fluidly connected to the reservoir system and a point of use.

In another embodiment, the present invention provides a method for providing treated water. The method can comprise storing water from a point of entry, removing at least a portion of any undesired species from the water in an electrochemical device to produce treated water, measuring at least one water property of the treated water, and transferring at least a portion of the treated water to a point of use according to the measured property.

In another embodiment, the present invention provides an electrodeionization system comprising a reservoir system fluidly connected to a point of entry and having a water property sensor, an electrodeionization device fluidly connected to the reservoir system and a controller connected to the water property sensor for regulating a water flow from the reservoir system to a point of use.

In another aspect, the present invention provides a method for providing treated water. The method can comprise storing water from a point of entry under a pressure that is above atmospheric pressure, removing at least a portion of any undesired species from the water in a water treatment device to produce treated water, measuring a property of the treated water, determining a difference between the property of the treated water to a set point and controlling an operating parameter of the electrochemical device based on the difference between the property of the treated water and the set point.

In another embodiment, the present invention provides a method for facilitating water treatment. The method can comprise providing a water treatment system comprising an electrochemical device that is fluidly connected to a reservoir system having a water property sensor and a controller that is connected to the water property sensor for regulating a water flow from the reservoir system to a point of use. The treatment system is fluidly connectable to a point of entry and to the point of use.

In another embodiment, the present invention provides a method for facilitating water treatment. The method can comprise providing a water treatment system comprising a reservoir system having a baffle plate and an electrochemical device. The reservoir system is fluidly connectable to a point of entry and to a water distribution system.

In another embodiment, the present invention provides a water treatment system comprising means for storing water that is fluidly connected to a point of entry and an electrochemical device, means for determining a water property in the means for storing water and means for delivering the water to a point of use based on the water property.

In another aspect, the present invention provides a method for providing treated water. The method can comprise storing water from a point of entry, removing at least a portion of any undesirable species from the water to produce treated water, storing at least a portion of the treated water and minimizing any mixing of the water from the point of entry and the treated water.

In yet another embodiment, the present invention provides a method for providing treated water. The method can comprise storing water from a point of entry in a first zone of a reservoir system, removing at least a portion of any undesirable species from the water to produce treated water, and storing at least a portion of the treated water in a second zone of the reservoir system.

In another aspect, the present invention provides a method for purifying water. The method can comprise storing water from a point of use, releasing any volatilizable material from the stored water, removing at least a portion of any undesirable species from the water in water treatment device to produce treated water, and storing at least a portion of the treated water.

In another aspect, the present invention provides a method for purifying water. The method can comprise storing water from a point of use, aerating the stored water, removing at least a portion of any undesirable species from the water in an electrodeionization device to produce treated water, and storing at least a portion of the treated water.

In another aspect, the present invention provides a water treatment system comprising a reservoir system fluidly connected to a point of entry and comprising a ventilation system, an electrodeionization device fluidly connected to the reservoir system, and a point of use fluidly connected to the reservoir system.

In another aspect, the present invention provides a water treatment system comprising a reservoir system fluidly connected to a point of entry and comprising an aeration system, a water treatment device fluidly connected to the reservoir system, and a point of use fluidly connected to the reservoir system.

Other advantages, novel features and objects of the invention will become apparent from the following detailed description of the invention when considered in conjunction with the accompanying drawings, which are schematic and are not intended to be drawn to scale. In the figures, each identical or substantially similar component that is illustrated in various figures is represented by a single numeral or notation. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

Preferred, non-limiting embodiments of the present invention will be described by way of example and with reference to the accompanying drawings, in which.

DETAILED DESCRIPTION OF THE INVENTION

Figure 1:
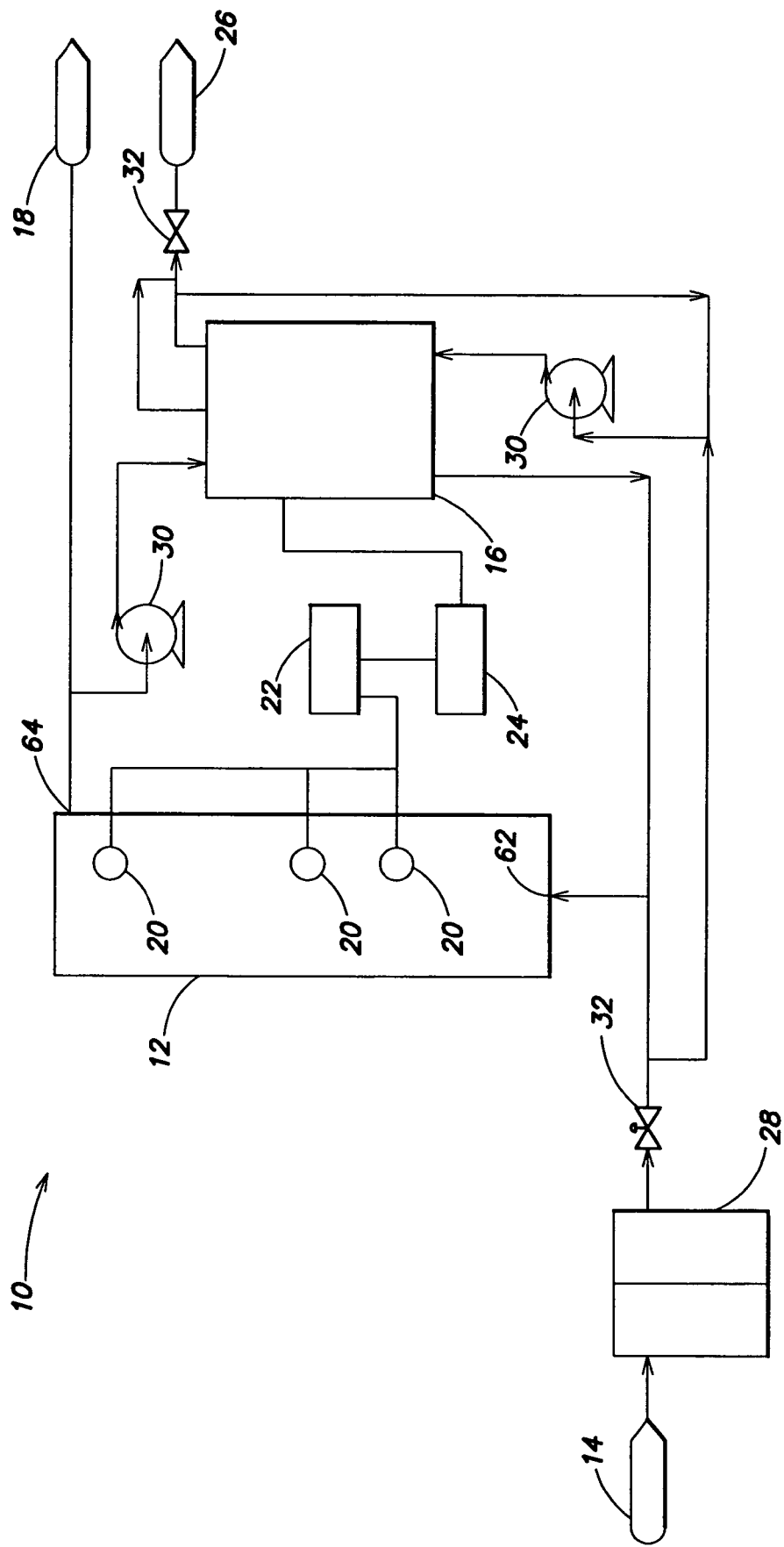
FIG. 1 is a process flow diagram of a water treatment system showing a reservoir system having a set of sensors and a treatment device, such as an electrochemical treatment device, in accordance with one or more embodiments of the present invention.

U.S. patent applications titled WATER TREATMENT SYSTEM AND METHOD by Wilkins et al. and filed on even date herewith; WATER TREATMENT SYSTEM AND METHOD by Jha et al. and filed on even date herewith; WATER TREATMENT SYSTEM AND METHOD by Ganzi et al. and filed on even date herewith; WATER TREATMENT SYSTEM AND METHOD by Wilkins et al. and filed on even date herewith; WATER TREATMENT SYSTEM AND METHOD by Freydina et al. and filed on even date herewith; WATER TREATMENT SYSTEM AND METHOD by Wilkins et al. and filed on even date herewith; and WATER TREATMENT SYSTEM AND METHOD by Jha et al. and filed on even date herewith are hereby incorporated by reference herein.

The present invention is directed to a fluid treatment system and methods for providing treated fluids in industrial, commercial and residential applications. The present invention will be described using water as the fluid but should not be limited as such. For example, where reference is made to treated water, it is believed that other fluids that can be treated according to the present invention. Moreover, where reference is made to a component of the system, or to a step of the method, of the present invention that adjusts, modifies, measures or operates on water or water property, the present invention is believed to be applicable as well. For example, the fluid to be treated may be a fluid that is a mixture comprising water. Accordingly, the fluid can be a liquid that comprises water.

The treatment system can provide purified, treated or softened water to a point of use by reducing a concentration of or removing at least a portion of any hardness-causing species contained in water from a water source, such as municipal water, well water, brackish water and water containing foulants. Other applications of the system would be in the treatment and processing of foods and beverages, sugars, various industries, such as the chemical, pharmaceutical, food and beverage, wastewater treatments and power-generating industries. The water treatment system typically includes at least one baffle plate in a reservoir system. Alternatively, or in combination, the water treatment system comprises at least one water property sensor for measuring at least one water property.

The water treatment system of the present invention typically receives water from the water source or a point of entry and treats the water containing at least some undesirable species before delivering the treated water to a point of use. The treatment system typically has a reservoir system in line with a treatment device, which can comprise an electrochemical treatment device such as an electrodeionization device. The treatment system, in accordance with some embodiments of the present invention further comprises a sensor for measuring at least one property of the water or an operating condition of the treatment system. In other embodiments of the present invention, the treatment system also includes a controller for adjusting or regulating at least one operating parameter of the treatment system or a component of the treatment system.

FIG. 1 shows a schematic flow diagram of a water treatment system according to one embodiment of the present invention. The water treatment system 10 includes a reservoir system 12 fluidly connected, typically at an upstream end, to a water source or a point of entry 14 and to a treatment device such as an electrochemical device which can comprise an electrodeionization device 16, typically at a downstream end. Water treatment system 10 typically includes a point of use 18, which is typically fluidly connected downstream of reservoir system 12. In certain embodiments of the invention, water treatment system 10 also has a sensor 20 and a controller 22 for controlling or regulating power source 24 which provides power to electrodeionization device 16. Electrodeionization device 16 typically removes undesirable species from water to be treated flowing from point of entry 14 to produce treated water for storage into reservoir system 12 and ultimate delivery to point of use 18. Undesirable species removed by electrodeionization device 16 is typically transferred to an auxiliary use or a drain 26.

Water treatment system 10, in certain embodiments further includes pretreatment system 28, which is typically fluidly connected upstream of reservoir system 12 or electrodeionization device 16. Moreover, water treatment system 10 typically also includes fluid control components, such as pump 30 and valve 32.

The present invention will be further understood in light of the following definitions. As used herein, "pressurized" refers to a system or component that has a pressure, internal or applied, that is above atmospheric pressure. For example, a pressurized reservoir system has an internal pressure that is greater than atmospheric pressure. Pressure in the pressurized reservoir system can be created by various methods and techniques, for example, by pressurizing the water with a water pump or by elevating the water source, thus creating head pressure. The components, systems, or techniques of the present invention can incorporate or utilize any suitable water treatment or purification device or apparatus or technique that removes or at least reduces a concentration of any undesirable species in a fluid to be treated and is not necessarily limited to purifying or treating water with an electrodeionization device. Thus, in accordance with one or more embodiments of the present invention, the treatment system can comprise a treatment device comprising at least one of a reverse osmosis device, a electrochemical device, an ultrafiltration device, a microfiltration device, and, in some cases, a distillation device. Further, although the phrase "electrodionization device" is used herein with reference to treating water, other treatment devices, including electrochemical devices, which can treat or purify water to remove one or more undesirable species from a fluid, can be used. Examples of such electrochemical devices include, but are not limited to, devices that incorporate principles of electrodialysis and/or capacitive deionization.

Figure 2:
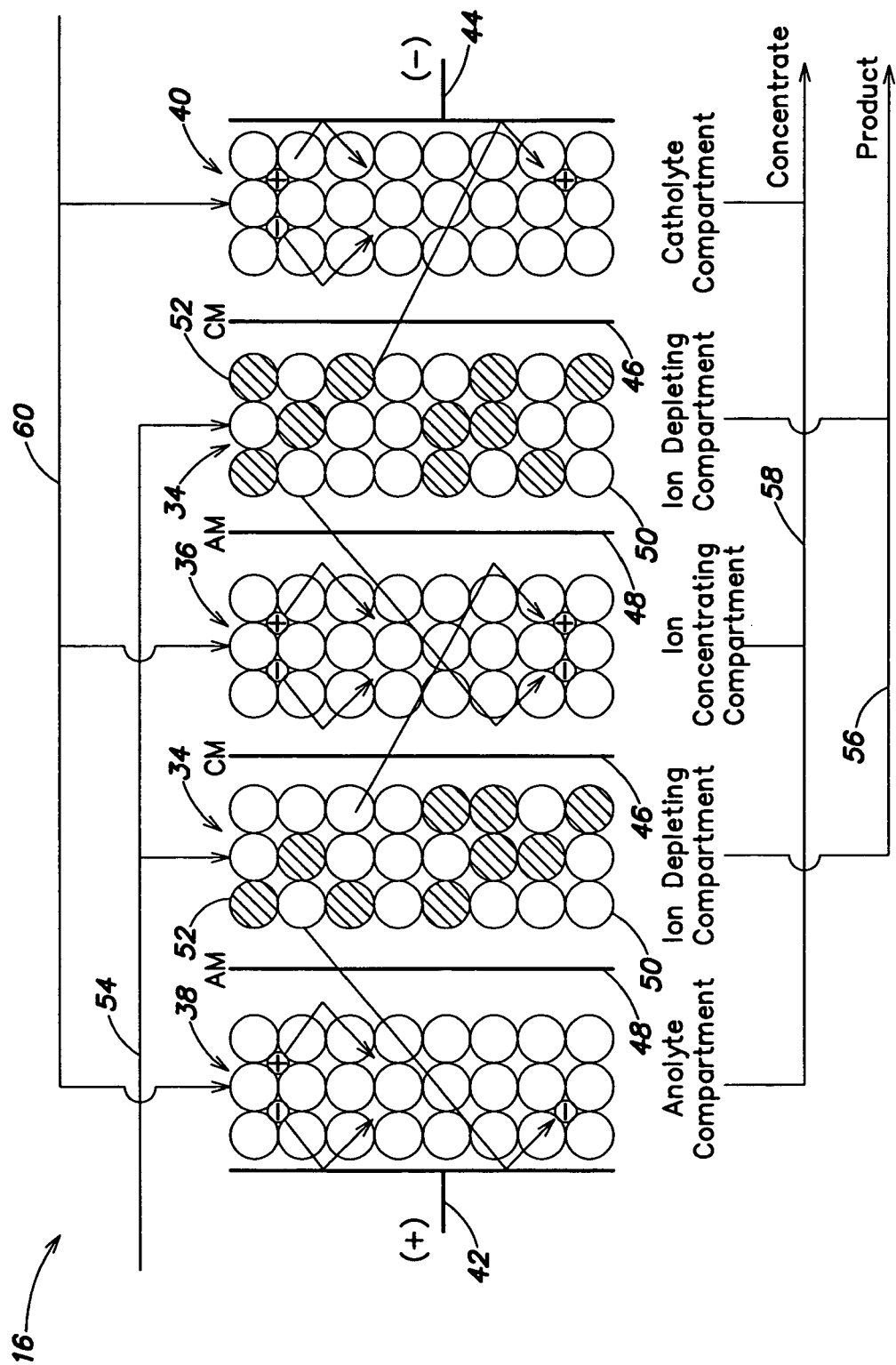
FIG. 2 is a schematic, sectional view through a typical electrodeionization device, illustrating the fluid and ion flow directions through depleting and concentrating compartments in accordance with one or more embodiments of the present invention.

FIG. 2 schematically shows a cross-sectional view of fluid and ion flow paths through one embodiment of an electrodeionization device in accordance with the present invention. The electrodeionization module or device 16 includes ion-depleting (depleting) compartments 34 and ion-concentrating (concentrating) compartments 36, positioned between ion-depleting compartments 34. Depleting compartments 34 are typically bordered by an anolyte compartment 38 and a catholyte compartment 40. Typically, end blocks (not shown) are positioned adjacent to end plates (not shown) to house an anode 42 and a cathode 44 in their respective compartments. In certain embodiments of the present invention, the compartments include cation-selective membranes 46 and anion-selective membranes 48, which are typically peripherally sealed to the periphery of both sides of the compartments.

The cation-selective membranes and anion-selective membranes are typically comprised of an ion exchange powder, a polyethylene powder binder and a glycerin lubricant. In some embodiments, the cation- and anion-selective membranes are typically heterogeneous polyolefin-based membranes, which are typically extruded by a thermoplastic process using heat and pressure to create a composite sheet. However, the present invention contemplates the use of homogenous membranes as well as combinations of homogeneous and heterogeneous membranes. Representative suitable ion-selective membranes include, for example, web supported using styrene-divinyl benzene with sulphonic acid or quaternary ammonium functional groups, web supported using styrene-divinyl benzene in a polyvinylidene fluoride binder, and unsupported-sulfonated styrene and quarternized vinyl benzyl amine grafts on polyethylene sheet.

Concentrating compartments 36 are typically filled with cation exchange resin 50 and depleting compartments 34 are typically filled with cation exchange resin 50 and anion exchange resin 52. In some embodiments of the present invention, the cation exchange and anion exchange resins can be arranged in layers within any of the depleting, concentrating and electrode compartments so that a number of layers in a variety of arrangements can be assembled. Other embodiments are believed to be within the scope of the invention including, for example, the use of mixed bed ion exchange resins in any of the ion-depleting, concentrating and electrode compartments, the use of inert resin between layer beds of anionic and cationic exchange resins, the use of various types and arrangements of anionic and cationic resins including, but not limited to, those described by DiMascio et al., in U.S. Pat. No. 5,858,191, which is incorporated herein by reference in its entirety.

In operation, a liquid to be treated 54, typically from an upstream water source entering the treatment system at point of entry 14, having dissolved cationic and anionic components, including hardness ion species, is introduced into ion-depleting compartments 34 through manifold 60, wherein the cationic components are attracted to the cation exchange resin 50 and the anionic components are attracted to the anion exchange resin 52. An electric field applied across electrodeionization device 16, through anode 42 and cathode 44, which are typically positioned on opposite ends of electrodeionization device 16, typically passes perpendicularly relative to the fluid flow direction such that cationic and anionic components in the liquid tend to migrate in a direction corresponding to their attracting electrodes.

Cationic components can migrate through cation-selective membrane 46 into adjacent concentrating compartment 36. Anion-selective membrane 48, positioned on the opposite side of concentrating compartment 36, can prevent migration into adjacent compartments, thereby trapping the cationic components in the concentrating compartment. Similarly, anionic components can migrate through the ion-selective membranes, but in a direction that is typically opposite or counter relative to the migration direction of the cationic components. Anionic components can migrate through anion-selective membrane 48, from ion-depleting compartment 34, into adjacent concentrating compartment 36. Cation-selective membrane 46, positioned on the other side of concentrating compartment 36, can prevent further migration, thus effectively trapping anionic components in the ion-concentrating compartment. In net effect, ionic components are removed or depleted from the liquid 54 depleting compartments 34 and collected in concentrating compartments 36 resulting in a treated water product stream 56 and a concentrate or waste stream 58.

In accordance with some embodiments of the present invention, the applied electric field on electrodeionization device 16 can create a polarization phenomenon, which leads to the dissociation of water into hydrogen and hydroxyl ions. The hydrogen and hydroxyl ions regenerate the ion exchange resins 50 and 52 in depleting compartments 34, so that removal of dissolved ionic components can occur continuously and without a separate step for regenerating exhausted ion exchange resins because of the ionic species migration. The applied electric field across electrodeionization device 16 is typically a direct current. However, any applied electric field that creates a bias or a potential difference between one electrode and another can be used to promote migration of ionic species. Therefore, an alternating current may be used, provided that there is a potential difference between electrodes that is sufficient to attract cationic and anionic species to the respective attracting electrodes. In yet another embodiment in accordance with the systems and techniques of the present invention, an alternating current may be rectified, for example, by using a diode or a bridge rectifier, to convert an alternating current to a pulsating direct current that provides a potential gradient across the electrodeionization device.

The electroactive media, the ion exchange resins 50 and 52, typically utilized in depleting compartments 34, can have a variety of functional groups on their surface regions, such as tertiary, alkyl amino groups and dimethyl ethanolamine. These materials can also be used in combinations with ion exchange resin materials having various functional groups on their surface regions, such as quaternary ammonium groups. Other types of electroactive media can also be utilized. Examples of such include, but are not limited to, electroactive fibers.

Reservoir system 12 can store or accumulate water from point of entry 14 or a water source and can also serve to store treated water from product stream 56 from electrodeionization device 16 and provide water, typically treated water or treated water mixed with water from point of entry 14 to point of use 18 through a distribution system. In one embodiment, reservoir system 12 can be pressurized with a pressure that is above atmospheric pressure.

In accordance with some embodiments of the present invention, reservoir system 12 comprises a vessel or a vessel that has inlets and outlets for fluid flow such as an inlet 62 and an outlet 64. Inlet 62 is typically fluidly connected to point of entry 14 and outlet 64 is typically fluidly connected to a water distribution system or a point of use 18. Reservoir system 12 can have several vessels or vessels having several inlets positioned at various locations on each vessel. Similarly, outlet 64 may be positioned on each vessel at various locations depending on, among other things, demand or flow rate to point of use 18, capacity or efficiency of electrodeionization device 16 and capacity or hold-up of reservoir system 12. Reservoir system 12 can further comprise various components or elements that perform desirable functions or avoid undesirable consequences. For example, reservoir system 12 can have a plurality of vessels having internal components, such as baffle plates, generally referred to as baffles, that are positioned to disrupt any internal fluid flow currents within the vessels of reservoir system 12. In some embodiments of the present invention, reservoir system 12 has a heat exchanger for heating or cooling the fluid. For example, reservoir system 12 can comprise a vessel with a heating coil, which can have a heating fluid at an elevated temperature relative to the temperature of the fluid in the vessel. The heating fluid may be hot water in closed-loop flow with a heating unit operation such as a furnace so that the heating fluid temperature is raised in the furnace and the heating fluid temperature is lowered in the vessel because of heat transfer to the vessel fluid. Other examples of auxiliary or additional components include, but are not limited to, pressure relief valves designed to relieve internal pressure of any vessels and avoid or at least reduce the likelihood of vessel rupture and thermal expansion tanks that are suitable for maintaining a desired operating pressure. The size and capacity of a thermal expansion tank will depend on one or more factors including, but not limited to, the total volume of water, the operating temperature and pressure of the reservoir system.

In operation, reservoir system 12 is typically connected downstream of point of entry 14 and fluidly connected in-line, such as in a recirculation loop, with electrodeionization device 16. For example, water from point of entry 14 can flow into inlet 62 and can mix with the bulk water contained within reservoir system 12. Bulk water can exit reservoir system 12 through outlet 64 and can be directed to point of use 18 or through pump 30 into electrodeionization device 16 for treatment or removal of any undesirable species. Treated water leaving electrodeionization device 16 may mix with water from point of entry 14 and enter reservoir system 12 through inlet 62. In this way, a loop can be formed or defined between reservoir system 12 and electrodeionization device 16 and feedwater from point of entry 14 can replenish water demand created by and flowing to point of use 18.

Point of entry 14 typically provides water from a water source or connects the water source to the water treatment system. The water source can be a potable water source, such as municipal water or well water or it can be from a brackish or saltwater source. In some embodiments, a pretreatment system purifies the water so that it is suitable for human consumption before reaching point of entry 14. The water typically contains dissolved salts or ionic or ionizable species including sodium, chloride, calcium ions, magnesium ions, carbonates, sulfates or other insoluble or semisoluble species or dissolved gases, such as silica and carbon dioxide. Moreover, the water can contain additives, such as fluoride, chlorate and bromate species. Thus, for example, point of entry 14 may be the point of entry for an industrial, commercial or household setting.

In accordance with further embodiments of the invention, the treatment system can comprise at least two vessels or two zones in one or more vessels, each of which can be, at least partially, fluidly isolated from the other. For example, the treatment system can comprise two vessels fluidly connected to a point of entry and to one or more treatment devices. The two vessels can be fluidly isolated from each other by conduits and valves so that a first vessel can be placed in service with one or more treatment devices while a second vessel can be removed from service for, for example, maintenance or cleaning.

In accordance with another embodiment of the present invention, water treatment system 10 can include a water distribution system, which in turn can connect to a point of use. The water distribution system may comprise components that are fluidly connected to provide water, typically treated water, from reservoir system 12 to point of use 18. The water distribution system may comprise any arrangement of pipes, valves, tees, pumps and manifolds to provide water from reservoir system 12 to one or several points of use 18 or to any component of water treatment system 10. And, according to one embodiment of the invention, the water distribution system is a water distribution system in a commercial, industrial or household setting that provides potable water to several points of use.

Point of use 18 is typically any device or appliance that requires or demands water. For example, point of use 18 can be an appliance, such as a washing machine or a dishwasher, or can be a faucet serving to provide water to a kitchen sink or a showerhead. In another embodiment of the invention, point of use 18 comprises a system for providing water suitable for household or residential use.

In accordance with another embodiment of the present invention, water treatment system 10 also comprises a sensor, typically a water property sensor, which measures at least one physical property of the water in water treatment system 10. For example, sensor 20 can be a device that can measure turbidity, water conductivity, pH, temperature, pressure, flow rate or composition. Sensor 20 can be installed or positioned within water treatment system 10, or any component thereof, to measure a water property or used in combination with one or more sensors to indicate the water quality in water treatment system 10. For example, sensor 20 can be a water conductivity sensor installed in reservoir system 12 so that sensor 20 measures the conductivity of the water, which can indicate the quality of the water available for service in point of use 18.

In another aspect of the present invention, water treatment system 10 has multiple sensors, for example, a combination of any of pH, temperature, pressure and flow rate sensors. And in another embodiment, sensor 20 may comprise a series or a set of sensors in reservoir system 12. The series or set of sensors may be arranged and connected to controller 22 so that the water quality is monitored, intermittently or continuously, through controller 22, and, in some embodiments, the operation of water treatment system 10 can be optimized as described below. Other embodiments of the present invention can comprise a combination of sets of sensors in various locations throughout water treatment system 10. For example, sensor 20 can be a flow sensor measuring a flow rate to a point of use 18 and further include any of a nephelometer, pH, temperature and pressure sensor monitoring the operating condition of water treatment system 10.

In accordance with another embodiment of the present invention, water treatment system 10 may further comprise a pretreatment system 28 designed to remove a portion of any undesirable species from the water before the water is introduced to, for example, reservoir system 12 or the electrodeionization device 16. Examples of pretreatment systems include, but are not limited to, reverse osmosis devices, which are typically used to desalinate brackish or salt water. Carbon or charcoal filter may be necessary to remove at least a portion of any chlorine, including active chlorine, or any species that may foul or interfere with the operation of electrodeionization device 16. In accordance with further embodiments of the present invention, pretreatment system 28 can comprise any apparatus or device that removes or at least renders inactive any microorganism such as bacteria that may be present in one or more components of the treatment system. For example, a pretreatment apparatus may be disposed upstream of the electrochemical device and/or the reservoir. Examples of such suitable devices that can render bacteria at least partially inactive include devices that utilize ozone and/or actinic radiation. Further, in other embodiments of the present invention, such bacterial inactivating devices be installed or utilized at or near a point of use so that fluids such as water delivered to a point of use can be essentially disinfected. Other types of pre and/or post treatment systems can utilize microfiltration and/or ultrafiltration techniques.

Pretreatment system 28 may be positioned anywhere within water treatment system 10. For example, pretreatment system 28 can be positioned upstream of reservoir system 12 or downstream of system 12 but upstream of electrodeionization device 16 so that at least some chlorine species are retained in reservoir system 12 but are removed before the water enters electrodeionization device 16.

In accordance with further embodiments of the invention, the treatment system can comprise systems and techniques that permit disinfection of any component of the treatment system. For example, the treatment system can be exposed to a disinfecting solution or a disinfectant. The disinfectant can be any material that can destroy or at least renders inactive a portion of any microorganisms, such as bacteria, present in any component or subsystem of the treatment system. Examples of a disinfectant can include any base, acid or sanitizer, such as a halogen or halogen-donating compounds, peroxygen or peroxygen-donating compounds that destroys or renders bacteria inactive. The disinfectant can be introduced into the treatment system by any suitable device or technique. For example, the disinfectant can be introduced into a water treatment system by introducing chlorine into the reservoir system. Introducing chlorine can be performed by injection of a hypochlorate species from a disinfectant reservoir fluidly connectable to any suitable portion of the treatment system. The chlorinated water can be further circulated through at least a portion of the treatment system thereby exposing wetted portions of the system to the disinfectant.

In accordance with one or more embodiments of the present invention, water treatment system 10 further comprises a controller 22 that is capable of monitoring and regulating the operating conditions of water treatment system 10 and its components. Controller 22 typically comprises a microprocessor-based device, such as a programmable logic controller (PLC) or a distributed control system that receives or sends input and output signals to components of water treatment system 10. For example, controller 22 can be a PLC that sends a signal to power source 24, which supplies power to electrodeionization device 16 or can provide a signal to a motor control center that provides power to pumps 30. In certain embodiments of the present invention, controller 22 regulates the operating conditions of water treatment system 10 in open-loop or closed-loop control scheme. In accordance with one embodiment of the invention, controller 22, in open-loop control, can provide signals to the water treatment system such that water is treated without measuring any operating condition. In contrast, controller 22 may control the operating conditions in closed-loop control so that operating parameters may be adjusted depending on an operating condition measured by, for example, sensor 20. In yet another embodiment of the invention, controller 22 may further comprise a communication system such as a remote communication device for transmitting or sending any of measured operating condition or operating parameter to a remote station.

Controller 22 can provide a signal that actuates any valves 32 in water treatment system 10 so that fluid flow in water treatment system 10 can be adjusted based on a variety of parameters including, but not limited to, the quality of water from point of entry 14, the quality of water to point of use 18, the demand or quantity of water to point of use 18, the operating efficiency or capacity of electrodeionization device 16, or any of a variety of operating conditions, such as the water conductivity, composition, pH, turbidity, alkalinity, temperature, pressure and flow rate. Thus, in one or more embodiments of the present invention, controller 22 can receive a signal from sensor 20, or a set of signals from a combination of sensors or sets of sensors, so that controller 22 can be capable of monitoring the operating parameters of water treatment system 10. For example, sensor 20 can be a water conductivity sensor positioned within reservoir system 12 so that the water conductivity in reservoir system 12 can be monitored by controller 22. Controller 22 can, based on the signals from, for example, sensor 20, control power source 24, which provides an electric field to electrodeionization device 16. In operation, controller 22 can increase, decrease or otherwise adjust the voltage, current, or both, supplied to electrodeionization device 16.

In another embodiment of the present invention, controller 22 may reverse the direction of the applied field from power source 24 to electrodeionization device 16 according to a predetermined schedule or according to an operating condition, such as the water quality or any other operating parameter measured by sensor 20. For example, controller 22 can be configured to reverse the polarity of the electric field applied to electrodeionization device 16 when a measured parameter reaches a set point. In another embodiment, the present invention provides a controller that is capable of increasing, decreasing or otherwise adjusting a cycle time based on, for example, the measured water properties, such as but not limited to, total dissolved solids, water quality, including conductivity. The cycle of electrodeionization device 16 includes the period between reversals in the electric field, along with the associated changes, reversals or substitution of fluid flows within electrodeionization device 16. Polarity reversal, which has been described by, for example, Giuffrida et al., in U.S. Pat. No. 4,956,071, and which is incorporated herein by reference in its entirety, is considered to be within the scope of the present invention. Controller 22 may be configured or configurable by programming or may be self-adjusting such that it is capable of maximizing any of the service life and the efficiency of or reducing the operating cost of water treatment system 10. For example, controller 22 can comprise a microprocessor having user-selectable set points or self-adjusting set points that adjusts the applied voltage and current or both to electrodeionization device 16, the flow rate through the ion-concentrating and ion-depleting compartments of the electrodeionization device or the flow rate to discharge to drain 26 from the electrodeionization device or the pretreatment system or both.

Accordingly, in accordance with one or more embodiment, the water treatment system stores water from point of entry 18, which is typically connected to a water source and typically at a pressure that is above atmospheric pressure, in a first zone of reservoir system 12. Reservoir system 12 can be fluidly connected to a water distribution system that supplies treated water to point of use 18. Water treatment system 10 can have an electrochemical device such as an electrodeionization device 16 that purifies or treats water from point of entry 14 by removing at least a portion of any undesirable species to produce treated water that is introduced into reservoir system 12 in a second zone of reservoir system 12. First and second zones of reservoir system 12 can be monitored by at least one water quality sensor, more preferably, a set of water quality sensors connected to controller 22, which, in turn, can adjust an operating parameter of the electrochemical device. In this way, controller 22 can monitor the first and second zones of reservoir system 12 and regulate the operation of the electrochemical device depending on any of the properties measured by a sensor or a set of sensors 20 which measures the water properties of the water in the first and second zones. As used herein, the term "zone" refers to a volume, typically a volume of liquid in the reservoir system. For example, a reservoir system can have one container or vessel having two or more zones defined as portions of the vessel containing corresponding volumes. However, in accordance with some embodiments of invention, the reservoir system can have two or more zones wherein each zone is defined by a corresponding, separate vessel.

In accordance with another embodiment of the present invention, controller 22, through sensor or set of sensors 20 or combinations thereof, can monitor or measure at least one water property of the water in the first and second zones of reservoir system 12 and also measure a flow rate flowing into at least one point of use 18 and can adjust an operating parameter of electrodeionization device 16 based on the measured properties. Thus, in one or more embodiments of the present invention, sensor 20 measures at least one property of at least one of the water from the point of entry and the treated water. For example, when an increased flow rate is measured to point of use 18, controller 22 can adjust an operating parameter, such as an applied voltage or current, of electrodeionization device 16 to treat water to compensate for any additional demand flowing into point of use 18. In another embodiment, controller 22 can adjust an operating parameter of electrodeionization device 16 depending on the volume in the first and second zones of reservoir system 12 and the historical demand, e.g. water demand, required by point of use 18.

In accordance with another embodiment of the present invention, reservoir system 12 has partitions that separate treated water from untreated water or mixtures of treated water with untreated water. Controller 22, through measurement sensors 20 and valves 32, can control the flow of treated, raw or mixed water to a particular point of use, depending on specific needs of that point of use. For example, if point of use 18 requires softened water, then controller 22 can open one or more valves 32 in the water distribution system so that only treated water is provided to point of use 18. Or, if point of use 18 does not require softened water, then controller 22 would isolate treated water in reservoir system 12 and allow raw water to flow through the water distribution system to point of use 18 by opening the appropriate valves.

In accordance with another embodiment of the present invention, reservoir system 12 is capable of isolating purified or treated water from raw water into zones by use of techniques or structures such as partitions or baffles or by utilizing separate vessels which may be isolated from each other. In this way, controller 22 can control one or more valves 32 so that raw water can be introduced into electrodeionization device 16 and treated water from the electrodeionization device can be transferred to the zone or vessel of treated water. Moreover, controller 22 can supply water to point of use 18 depending on the requirements of point of use 18 in a similar fashion as described above. Thus, in another embodiment of the invention, the fluid volumes of the first and second zones can be adjusted depending on several factors including, for example, the demand by a point of use, the operating efficiency of the electrodeionization device and the water property of the water in the zones. The system can also comprise aeration devices, which can introduce a gas, such as air, and ventilation devices, to effect dissolution of air and/or to volatilize or purge undesirable species, such as compounds that can affect the taste of water. Any unit operation that permits mass transfer to and from the fluid, such as water, can be utilized in accordance with the techniques of the present invention. Examples of aerating device include, but are not limited to bubblers and perforated tubes or lines submerged in fluid to be aerated, such as treated water or water from a point of use. In accordance with another example, aeration can be performed by exposing the fluid to be aerated in an open air channel having, preferably, features such as In accordance with another embodiment of the present invention, controller 22 can calculate a control parameter that can be used to adjust or vary a control signal to a component of the water treatment system. For example, controller 22 can calculate a Larigelier Saturation Index (LSI) based on the measured operating conditions of the streams of the water treatment system. Calculated LSI can then be used in another or the same control loop, in the same or another controller, as an input variable that can be compared to a set-point and generate an output signal that actuates, adjusts or otherwise regulates a component of the water treatment system. LSI can be calculated according to, for example, ASTM D 3739. In some embodiments of the present invention, the treated water, such as the softened water, has a low LSI so that it has a low tendency to form scale. As used herein, low LSI water has a LSI of about less than 2, preferably, less than about 1, and more preferably, less than about zero. In another embodiment of the present invention, the treated water has a low conductivity that is less than about 300 μS/cm, preferably less than about 220 μS/cm and more preferably, less than about 200 μS/cm.

In accordance with another embodiment of the present invention, controller 22 can regulate the operation of the water treatment system by incorporating adaptive or predictive algorithms, which are capable of monitoring demand and water quality and can adjust the operation of the electrochemical device, such as increasing or decreasing the applied voltage or the period between electric field reversals of electrodeionization device 16. For example, controller 22 can be predictive in anticipating higher demand for treated water during early morning hours in a residential application to supply point of use 18 serving as a showerhead. Controller 22 can incorporate dead band control to reduce the likelihood of unstable on/off control or chattering. Dead band refers to the range of signal outputs that a sensor provides without necessarily triggering a responsive control signal. The dead band may reside, in some embodiments of the invention, intrinsically in the sensor or may be programmed as part of the control system, or both. Dead band control can avoid unnecessary intermittent operation by smoothing out any measurement excursions. Such control techniques can prolong the operating life or mean time before failure of the components of water treatment system 10. Other techniques that can be used include the use of voting, time-smoothing or time-averaging measurements or combinations thereof.

In accordance with another embodiment of the present invention, stream 58 to auxiliary use can provide additional or secondary benefits. For example, stream 58, rather than going to drain 26, may be used to provide irrigating water to any residential, commercial or industrial use, such as for irrigating, for recycling or for recovery of collected or concentrated salts.

In accordance with another embodiment, the present invention can provide a vessel, or a plurality of vessels, having a plurality of outlet ports, each of which can be connected to a water distribution system. The plurality of outlets can permit the selective delivery of water to any point of use. The plurality of outlets can permit the system to deliver water having a specific or predetermined water quality to a specific point of use. For example, water having low conductivity can be delivered to a point of use, such as a shower, that does requires higher quality water. Such a system can also accommodate delivery of hard water to a point of use that is insensitive to water hardness. Sensors can measure the water conductivity as an indication of water quality. The control system can regulate valves or pumps, or both, in, for example, the distribution system, to provide water having the appropriate or closest water quality that corresponds to the water quality requirement of the point of use.

The present invention will be further illustrated through the following example, which is illustrative in nature and is not intended to limit the scope of the invention.

EXAMPLE

Figure 3:
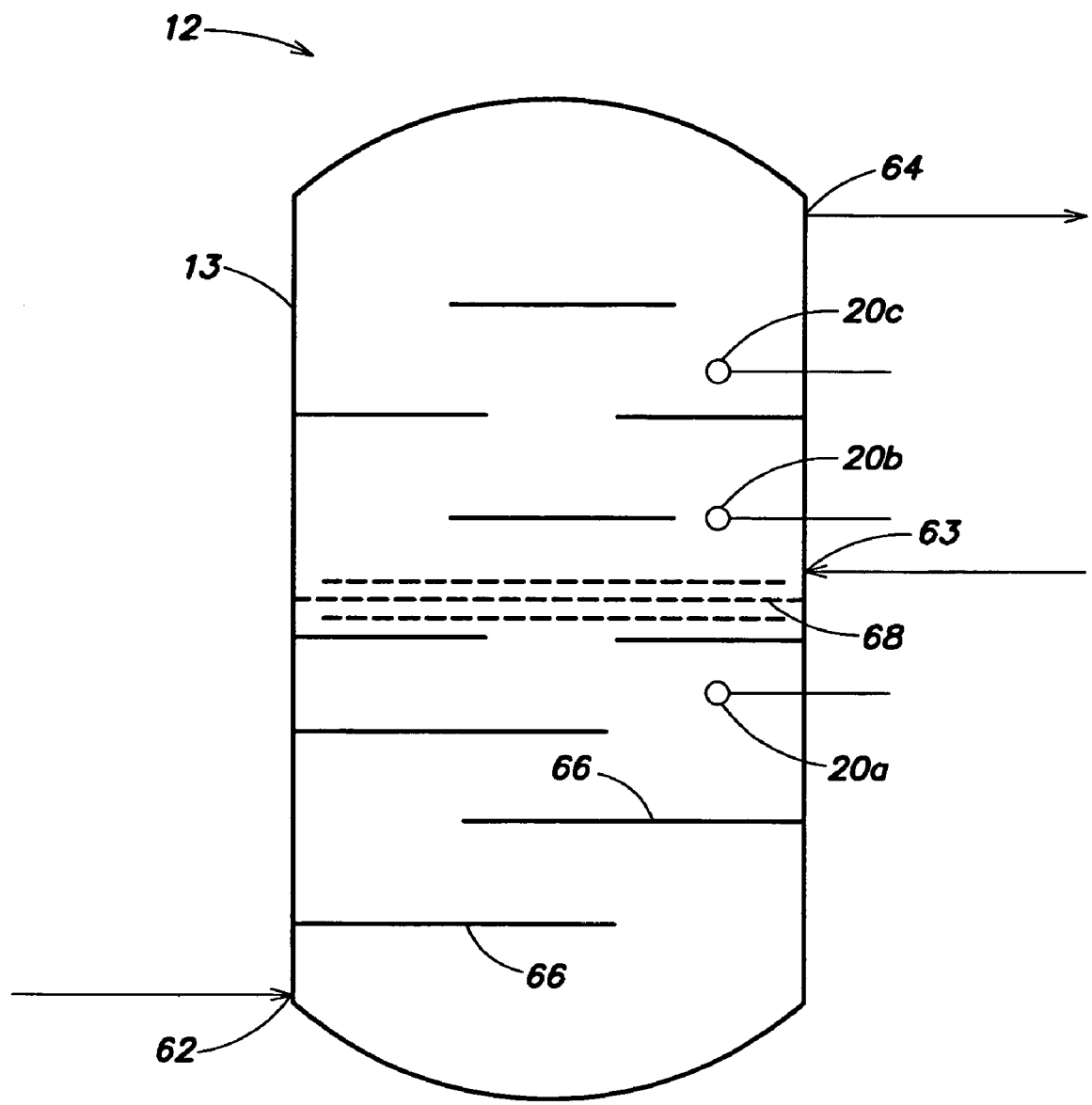
FIG. 3 is a schematic, sectional view through a vessel illustrating the use of baffle plates and sensors in accordance with one or more embodiments of the invention.

This prophetic example describes a water treatment system that can be designed according to the present invention. FIG. 3 is a schematic illustration of a reservoir system that can be used in the water treatment system of the present invention. The reservoir system 12 has a vessel 13 with an inlet 62, typically fluidly connected to a point of entry (not shown), and an outlet 64, typically fluidly connected to a point of use (not shown).

Vessel 13 has a second inlet 63 that is fluidly connected to an electrodeionization device (not shown). Vessel 13 has at least one baffle 66, which can be arranged in a variety of configuration including, for example, offset and rotated arrangements or combinations thereof. Moreover, baffle 66 can be single, double or triple segmental baffles or combinations thereof. At least one water property sensor 20 can be installed on vessel 13 for measuring a water property such as, pressure, temperature, pH and conductivity. Sensor 20 can be installed in a variety of configurations. As illustrated, three sensors 20a, 20b and 20c that measure the conductivity of the water are installed along the height of vessel 13. In operation, each sensor 20a, 20b and 20c provides a signal to a controller (not shown), which corresponds to the measured water conductivity.

The controller can be configured to average the measurements or can monitor any difference in water conductivity. In the former, the controller regulates the operating parameters of the electrodeionization device, which softens the water flowing from outlet 64 to produce treated water returning into second inlet 63 based on the average measured conductivity. In the latter arrangement, the controller monitors the interface between the treated and raw water in vessel 13 and regulates the operation of the electrodeionization device as necessary to provide treated water to the point of use. For example, before the interface 68 between raw and treated water, as measured by the difference in conductivity, reaches sensor 20*b*, the controller regulates the operation of the electrodeionization device to treat water at a first operating condition. If demand for treated water results in bringing interface 68 between sensor 20*b* and 20*c*, then the controller can regulate the electrodeionization device at a second operating condition that treats water at a faster rate or removes undesirable species at a faster rate. In this way, constructive use of baffles and sensor arrangement can optimize the operation of the water treatment system and components thereof.

Those skilled in the art would appreciate that all parameters and configurations described herein are meant to be exemplary and that actual parameters and configurations will depend upon the specific application for which the systems and methods of the present invention are used. Those skilled in the art will also recognize, or be able to ascertain using no more than routine experimentation, many equivalents to the specific embodiments of the invention described herein. For example, those skilled in the art can recognize that the present invention can be configured to minimize mixing between untreated water and treated water as well as to maximize such mixing when desirable or to control the degree of mixing according to need. Moreover, those of ordinary skill would be able to select materials of construction of the components or the system of the present invention using no more than routine experimentation. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems or methods, if such features, systems or methods are not mutually inconsistent, is considered to be within the scope of the present invention.

What is claimed is:

1. A method for facilitating water treatment comprising providing a water treatment system comprising an electrochemical device that is fluidly connected to a reservoir system having a water property sensor and a controller that is connected to the water property sensor for regulating a water flow from the reservoir system to a point of use, the treatment system is fluidly connectable to a point of entry and to the point of use.

2. A method for facilitating water treatment comprising providing a water treatment system comprising a reservoir system having a baffle plate and an electrodeionization device, the reservoir system is fluidly connectable to a point of entry and to a water distribution system.

3. A method for purifying water comprising:
storing water from a point of use;
aerating the stored water;
removing at least a portion of any undesirable species from the water in an electrodeionization device to produce treated water; and
storing at least a portion of the treated water.

4. The method of claim 3 wherein storing the at least a portion of the treated water comprises storing the treated water at a pressure that is above atmospheric pressure.

5. A method of providing treated water comprising:
storing water from a point of entry;
removing at least a portion of any undesired species from the water in an electrochemical device to produce treated water;
measuring an LSI of the treated water;
transferring at least a portion of the treated water to a point of use according to the measured LSI;
calculating a desired property of the treated water based on at least the LSI; and
adjusting an operating parameter of the electrochemical device based on the calculated desired property.

6. The method of claim 5 wherein the electrochemical device comprises an electrodeionization device.

7. The method of claim 5 wherein storing water from the point of entry is performed at a pressure that is above atmospheric pressure.

8. The method of claim 5 further comprising minimizing any mixing of the water from the point of entry with the treated water.

9. The method of claim 5 further comprising mixing of the water from the point of entry with the treated water.

10. A method of providing treated water comprising:
storing water from a point of entry;
removing at least a portion of any undesired species from the water in an electrochemical device to produce treated water;
measuring at least one water property of the treated water;
transferring at least a portion of the treated water to a point of use according to the measured property;
calculating a desired property of the treated water based on at least one measured water property; and
adjusting a cycle time of the electrochemical device based on the calculated desired property.

11. The method of claim 10 wherein the electrochemical device comprises an electrodeionization device.

12. The method of claim 10 wherein storing water from the point of entry is performed at a pressure that is above atmospheric pressure.

13. The method of claim 10 further comprising minimizing any mixing of the water from the point of entry with the treated water.

14. The method of claim 10 further comprising mixing of the water from the point of entry with the treated water.

15. A method for providing treated water comprising:
storing water from a point of entry under a pressure that is above atmospheric pressure;
removing at least a portion of any undesired species from the water in a water treatment device to produce treated water;
measuring a property of the treated water;
determining a difference between the property of the treated water to a set point;
controlling an operating parameter of the water treatment device based on the difference between the property of the treated water and the set point; and
pre-treating the water prior to removing any undesired species.

16. The method of claim 15 wherein the water treatment device comprises an electrodeionization device.

17. The method of claim 15 further comprising minimizing any mixing of the water from the point of entry with the treated water.

18. The method of claim 15 further comprising mixing the water from the point of entry with the treated water.

19. A method for providing treated water comprising:
storing water from a point of entry under a pressure that is above atmospheric pressure;
removing at least a portion of any undesired species from the water in a water treatment device to produce treated water;

measuring a property of the treated water;
determining a difference between the property of the treated water to a set point;
    controlling an operating parameter of the water treatment device based on the difference between the property of the treated water and the set point; and
    controlling a flow of water to a point of use based on the difference between the property of the treated water and the set point.

20. The method of claim 19 wherein the water treatment device comprises an electrodeionization device.

21. The method of claim 19 further comprising minimizing any mixing of the water from the point of entry with the treated water.

22. The method of claim 19 further comprising mixing the water from the point of entry with the treated water.

23. A method for providing treated water comprising:
    storing water from a point of entry under a pressure that is above atmospheric pressure;
    removing at least a portion of any undesired species from the water in a water treatment device to produce treated water;
    measuring a property of the treated water;
determining a difference between the property of the treated water to a set point;
    controlling an operating parameter of the water treatment device based on the difference between the property of the treated water and the set point; and
    mixing the water from the point of entry with the treated water.

24. The method of claim 23 wherein the water treatment device comprises an electrodeionization device.

25. A method for providing treated water comprising:
    storing water from a point of entry under a pressure that is above atmospheric pressure;
    removing at least a portion of any undesired species from the water in an electrodeionization device to produce treated water;
    measuring a property of the treated water;
determining a difference between the property of the treated water to a set point; and
    controlling an operating parameter of the electrodeionization device based on the difference between the property of the treated water and the set point.

26. The method of claim 25 further comprising minimizing any mixing of the water from the point of entry with the treated water.

27. The method of claim 25 further comprising mixing the water from the point of entry with the treated water.

28. The method of claim 25 further comprising controlling a flow of the water to a point of use based on the difference between the property of the treated water and the set point.

29. A method for purifying water comprising acts of:
    storing water from a point of use;
    releasing any volatilizable material from the stored water;
    removing at least a portion of any undesirable species from the water in an electrochemical device to produce treated water; and
    storing at least a portion of the treated water.

30. The method of claim 29 wherein the electrochemical device comprises an electrodeionization device.

* * * * *